United States Patent [19]

Miller

[11] Patent Number: 5,086,093

[45] Date of Patent: Feb. 4, 1992

[54] AQUEOUS ORGANIC COMPOSITIONS AS CERAMIC BINDERS FOR CASTING AND MOLDING

[75] Inventor: Lawrence T. Miller, Vienna, W. Va.

[73] Assignee: Allied-Signal Inc., Morris Township, N.J.

[21] Appl. No.: 503,356

[22] Filed: Apr. 2, 1990

[51] Int. Cl.$^5$ ................................................. C08L 5/04
[52] U.S. Cl. ..................................... 524/28; 501/103;
501/127; 501/133; 501/152; 501/153; 501/154;
524/27; 524/33; 524/44; 524/55; 524/413;
524/430; 524/437; 524/442; 524/556
[58] Field of Search ................. 524/256, 28, 27, 35,
524/44, 55, 413, 430, 437, 442; 501/152, 153,
154, 103, 127, 133

[56] References Cited

U.S. PATENT DOCUMENTS

| | | | |
|---|---|---|---|
| 3,940,358 | 2/1976 | Bernett et al. | 524/425 X |
| 4,010,133 | 3/1977 | Nakayama | 524/413 |
| 4,174,331 | 11/1979 | Myles | 524/430 X |
| 4,207,226 | 6/1980 | Storm | 524/148 X |
| 4,336,171 | 6/1982 | Kohlstadt | 524/516 X |
| 4,540,736 | 9/1985 | Herten et al. | 524/556 |
| 4,551,496 | 11/1985 | Renlund et al. | 524/322 |
| 4,571,414 | 2/1986 | Renlund et al. | 524/322 |
| 4,614,755 | 9/1986 | Rodgers | 524/5 |
| 4,638,029 | 1/1987 | Meschke et al. | 524/445 X |
| 4,693,909 | 9/1987 | Ziegler et al. | 427/156 |
| 4,708,978 | 11/1987 | Rodgers | 524/5 |
| 4,882,110 | 11/1989 | Kramer et al. | 524/401 X |
| 5,019,537 | 5/1991 | Kato et al. | 524/560 X |

*Primary Examiner*—Joseph L. Schofer
*Assistant Examiner*—J. M. Reddick
*Attorney, Agent, or Firm*—Andrew N. Parfomak; Roger H. Criss

[57] ABSTRACT

The invention relates to aqueous organic compositions which find particular utility as binders in the processing stages necessary for the production of ceramic articles. More particularly, the aqueous organic compositions comprise polyethylene copolymers, especially ethylene-acrylic acid copolymers dispersed in water for use as a binding agent for the formation of ceramics, particularly metal oxides such as aluminum oxides. In an exemplary form, the aqueous organic composition combined with the ceramic particulates has a weight ratio of about 10% ceramics and 20% aqueous organic composition, although other mixtures may be formulated without detracting from the beneficial features of the invention.

20 Claims, No Drawings

AQUEOUS ORGANIC COMPOSITIONS AS CERAMIC BINDERS FOR CASTING AND MOLDING

BACKGROUND OF THE INVENTION

1. Field of the Invention

The invention relates to aqueous organic dispersions which find particular utility as binders in the processing stages necessary for the production of ceramic articles. More particularly, the aqueous organic dispersions comprise polyethylene-acrylic acid copolymers dispersed in water for use as a binding agent for the formation of ceramics, particularly ceramic oxides such as aluminum oxides.

2. Description of Prior Art

Ceramics are a material which enjoy use in applications which require materials which are durable and exhibit high heat resistance and low dielectric strength. Examples of uses of ceramics as engineering materials include diverse applications such as uses as electrical insulators, to components within an aircraft jet turbine. Their success in such, and other applications, ensures that ceramics remain a viable engineering material for a multitude of present, and future developed applications.

As is known to the art, the formation of useful articles from a ceramic material requires that the ceramic be formed by some means to the desired shape and then subsequently treated to unify the individual particles of the ceramic into the final form of the article or part. Although many useful processes to achieve these ends exist, two particularly useful processes enjoying widespread use include molding and casting operations. In both of these processes, the ceramic material, such as alumina-oxide or silica-oxide are mixed or otherwise combined with a "binding agent" and then introduced into a form, mold, or die, so to impart a particular form upon the combined ceramic and the binding agent. The binding agent, also known to the art as a "binder" imparts a certain degree of dimensional stability and form retention to the mixture which is a necessary feature to a molding and casting operation. Frequently, after the removal of the mold, the formed mixture, or "preform" is removed and subjected to a heating operation, wherein the heat is used to drive off the binding agent leaving a molded part which is essentially free from any organic materials. Subsequent to this step, the preform may be subjected to a sintering operation.

Many materials which find successful use as a binder in such molding or casting operations are well known to the art. These binders consist primarily of organic materials, such as polymers, paraffin waxes, polystyrene, polyethylenes and other materials. Examples of such materials include polyolefin waxes, celluslosics, "agar" and acrylics.

While these have proven successful, the use of organic materials in binders is not without its disadvantages. It has been noted that the use of binders consisting essentially of organic components tend to require extended times during a "burn off" step, or the sintering operation in order to remove the organic materials from the preform. Further it has been observed that using binders consisting essentially of, or comprising a large amount of organic materials in its composition, tends to produce cracks and blemishes in the article being produced. It is believed that the generally higher boiling points of the organics necessitate longer times for the sintering step of the process, and that the exit of the organic from the preform structure is hindered due to the size of the organic molecules. This behavior is seen to induce the formation of the cracks and blemishes in the preform.

Therefore, it should be readily apparent that there remains a continuing need in the art for improved materials and improved methods which may be utilized in the formation of ceramic articles.

SUMMARY OF THE INVENTION

The invention provides a mixture of a ceramic material and an aqueous organic composition wherein the aqueous organic composition comprises an aqueous dispersion of an ethylene copolymer. A further aspect of the invention is the provision of a process for forming ceramic articles comprising the steps of: providing a mixture which includes a ceramic material and an aqueous organic composition wherein the aqueous organic composition comprises an aqueous dispersion of an ethylene copolymer, and forming articles from the said mixture. A still further aspect of the invention is the provision of a process for forming ceramic articles which are essentially free organic materials. Further, the aqueous organic composition may be utilized in the production of ceramic articles wherein the composition is utilized as a binder which may be mixed with the ceramic constituent, typically ceramic particles having an average particle size of 10 microns or less, to form a ceramic preform. Most preferably, the ceramic particle sizes will have an average particle size of 1 micron or less. The use of the composition is especially beneficial where a pourable ceramic is to be used, such as in an injection molding, slip casting or transfer molding process. The composition exhibits excellent wettability characteristics which allows for the formation of ceramic slurries which comprise approximately 50% or more ceramic material, with the remaining balance comprising the binder composition according to the present invention.

DETAILED DESCRIPTION OF THE INVENTION

In the foregoing description, all references to percentages are to be considered as indications of percent be weight of a particular constituent relative to the total weight of the compound or composition of which it forms a part, unless clearly indicated as otherwise.

The ethylene copolymer which finds use in the Present invention (and which is hereinafter interchangeably referred to as "E/AA") may be characterized as being a copolymer of ethylene and an alpha,beta-ethylenically unsaturated carboxylic acid having at least one carboxylic group and which contains between 3 and 4 carbon atoms. Suitable examples of material which may be utilized comprising an alpha,beta-ethylenically unsaturated carboxylic acid within the above noted parameters include acrylic acid, and methacrylic acid. Of these, acrylic acid is preferred as the comonomer. The copolymer formed from these two reactants has an average molecular weight of between about 1500 and about 4000, and has an acid number of in excess of about 120; preferably the acid number is equal to or in excess of 150, and most preferably, the acid number is equal to or in excess of about 180. (The acid number of the copolymer is measured by the number of milligrams of potassium hydroxide necessary to neutralize one gram of the copolymer acid.) The amount of the acid in the copolymer should be sufficient to maintain the above noted acid values, especially the preferred values. The copolymer of the ethylene and alpha,beta-ethylenically unsaturated carboxylic acid and its method of production is described in U.S. Pat. No. 3,658,741 which is herein incorporated by reference. An exemplary commercial source of the E/AA copolymer is from Allied-Signal Inc. of Morristown, New Jersey under the trade designations "A-C 5180" and "A-C 5200". These are copolymers which may be described as ethylene-acrylic acid copolymers having a density of 0.93 g/cc, viscosities of 650 cps at 140 deg.C when measured according to the Brookfield standard, and having respective acid numbers of 180 and 200 respectively.

The aqueous dispersions of the instant invention are generally formed by heating the water and then introducing the copolymer thereto to form a disperion wherein the copolymer comprises between about 2 percent to about 50 percent of the total dispersed aqueous organic binder, and wherein the water forms the balance of the dispersion.

While not being limited to the following, it is hypothesized that the relatively high acid numbers of the copolymers is an important factor in the success of the invention; the high concentration of oxides of many ceramics are polar, and attracted to the carboxylic acid groups in the copolymer through the mechanism of ionic attraction. The ionic attraction between the composition and the ceramic enhances the wetting capabilities of the composition, thereby decreasing the amount of the aqueous organic composition which is necessary to effectively act as a binder in a ceramic molding process.

The aqueous organic compositions of the present invention may include other additives or constituents known to the art which are useful in ceramic molding processes.

A useful constituent is a diethyl amino ethanol (also interchangeably referred to as "DEAE"). The DEAE acts as a surfactant and acts as an excellent dispersal agent for the copolymer and thereby enhances the more homogeneous distribution of the organic constitutents in the water of the inventive composition.

A further useful constituent is a polyethylene ionomer which comprises magnesium. Such a constituent exhibits a low melting point (approximately 90 deg.C) which is near the operating temperature of typical injection molding machinery, but higher than mold temperatures. The ionomer acts as a binding agent which is in a melted condition in the injection molding machinery, but once extruded into the mold, rapid cools and solidifies which in turn adds stability to the ceramic prepreg. One example of a commercial source for this constituent is from Allied-Signal Inc. which markets it under the trademark "Aclyn 246". The ionomer may be added in small percentages relative to the total weight of the aqueous organic composition, preferably less than 8%.

A yet further useful constituent is a conventional binder such as methyl cellulose compound which is known to the art to act as a useful ceramic binder. An exemplary commercial source for this material is Dow Chemical Co. of Midland, Michigan, which markets this constituent under the trade designation "Methocel 20-231". This constituent may be added in relatively small amounts, preferably about 6% or less by weight relative to the total weight of the aqueous organic composition.

A yet further useful constituent which may be added as a component to the aqueous organic composition of the present invention is a hydroxylethyl cellulose which is a further material known to the art useful as a ceramic binder. A commercial source for this material is from Union Carbide Corp. which markets it under the trade designation "HEC 15000H". It may be added in small amounts, preferably in percentages of 6% or less by weight relative to the total weight of the aqueous organic composition.

Further constituents which may be added to the aqueous organic composition include materials known to the art to have beneficial effects in ceramic molding operations. These may include alternative materials which perform similar functions to those disclosed above, or those which perform other functions which may be desirable in particular applications. One such material is a gellation agent. Such constituents may be added in any proportion and amount except where they may have a detrimental effect upon the successful operation of the present invention.

Ceramics which may be used with the aqueous organic composition of the present invention may be any metal oxide, including, but not limited to silica oxide, alumina oxide, yttrium oxide and zirconium oxide. Mixtures of one or more metal oxides may be used. Preferably, alumina oxide is used as it exhibits a high degree of polarity which beneficially interacts with the aqueous organic composition, thus assuring good wettability and good distribution within the ceramic. Preferred examples of metal oxides are "A16-SG" is an "alpha" alumina oxide characterized as having a crystal size of about 0.3 to about 0.5 microns, and as having approximately 9 square meters of surface area per gram of material, and a "gamma" alumina oxide characterized as having approximately 180 square meters of surface area per gram. Both these materials are available commercially from Alcoa. While particulates of ceramics having any particle size normally used in the art for the formation of articles may be used with the composition particles having an average diameter of less than 10 microns, and more preferably less than 1 micron are generally preferred.

It is to be noted that the compositions of the present invention will form excellent dispersions of the organic constituents in the water, and will tend to remain fluid. A slight degree of gellation may be noted, but if desirable, this is avoided by further modifications of the relative ratios of the constitutents forming the aqueous organic compositions.

If, in the alternative, gellation of the composition is desired in order to improve the form retention of the preform, a suitable gellation agent may be introduced. This gellation agent may be any agent which is known to the art, including one or more of the following: agar, xantham gum, methyl cellulose, polyethylene glycols. Of these, the preferable agents are agar or methyl cellulose. As is well known to the art, gellation agents improve the rigidity of ceramic preforms and thus is frequently utilized. If a gellation agent is to be incorporated into the composition of an aqueous organic disperion, it should be added so to comprise a quantity of between about 3% to about 25% thereof, and it is preferably added after the formation of the dispersion of the E/AA in the water.

In broad terms, the process of forming articles in accordance with the invention is a two stage process;

preparation of the aqueous organic composition, followed by forming a slurry with the ceramic constituent.

The preparation of the aqueous organic composition may be in any manner known to the art which is used for forming mixtures or dispersions of organics in water. For example, the constituents of the composition may be weighed out in their proper relative proportions and introduced to the water in any manner known to the art for forming dispersions in water.

Subsequently, the aqueous organic composition may then be introduced to the ceramic material and then mixed in order to thoroughly distribute the aqueous organic composition with the ceramic in order to form the slurry; mixing methods which will assure good distribution of the aqueous organic composition known to the art are satisfactory and may be utilized. While the benefits of the invention will be realized where the weight ratio of the aqueous organic composition exceeds that of the ceramic, it is preferred that the amount of composition be added to the ceramic be in a minor percentage, so to minimize the amount of aqueous organic composition used as a binder, while retaining sufficient fluidity of the resulting binder/ceramic mixture to form a slurry which has good processing characteristics. This balance is desirable for injection molding processes. It has been found that an approximate weight ratio of about 80% ceramic constituent to 20% aqueous organic constituent used as the binder was a satisfactory ratio and provided a slurry with good processing characteristics; respective weight ratios of 85% ceramic constitutent to 15% binder yielded a slurry with poor processing characteristics. In all instances, it should be apparent that a satisfactory ratio of ceramic constituent to aqueous organic composition to form a useable slurry is to be determined by experimentation to suit the requirements of the particular process and particular equipment to be used.

The slurry may be used in any molding or casting process, including injection molding processes, in order to form a ceramic "preform" of an article. This preform may then be processed in order to remove, or "drive off" the aqueous organic composition which functions as a binder for the ceramic, after which the preform is subjected to a sintering operation in accordance with methods in common practice.

An important feature of the present invention is in the fact that as the aqueous organic composition exhibits excellent wettability with the ceramic particles, a relatively small amount is needed in order to act as an effective binder for any given quantity of ceramic particles. This is generally to be desired, as the preform formed from the molding or casting process comprises a relatively high proportion of ceramic particles relative to the proportion of the binder and this reduces the amount of time required in any process, such as a drying process, which is used to remove or "drive off" the binder from the preform either prior to or as part of the subsequent sintering operation. The relatively small proportion of binder improves the likelihood of the production of articles which are free from surface or internal defects which are induced due to the formation of channels, cracks or fractures within the preform, or surface cracks or blemishes by the exiting molecules of the binder. This is especially important in the case where the binder comprises a high proportion of, or consists essentially of organic materials. Frequently, such materials require high temperatures for ample periods in order to assure thorough removal of the binder from the preform.

A further important feature of the present invention lies in the fact that a major proportion of the aqueous organic composition consists of water, a material which exhibits excellent wettability, low tendency to form gels, and has a boiling point which is usually lower than the E/AA copolymer, and those of the other organic constituents. These properties are beneficial as it is believed that during the drying step where the binder is driven off from the preform, the water constituent of the aqueous organic composition evaporates first, and it is hypothesized that the evaporating water molecules increase the porosity of the ceramic and enhance the more homogeneous evaporation of any organic constituent, especially the E/Aa and thus discourage the formation of any channels or cracks in the preform. As is well known to the art, the formation of such channels, cracks or other fractures in the structure of the ceramic article provide discontinuities in the otherwise idealized homogeneous ceramic structure of a formed article, which discontinuities provide failure sites for the article.

The following "Example" of the enjoyment of the instant invention are provided by way of illustration, and not by way of limitation, which is the proper function of the appendant claims.

EXAMPLES OF THE INVENTION

EXAMPLES D1-D10

The compositions of Examples D1 through D10 comprise one of two ethylene/acrylic acid copolymers, "A-C 5180" or "A-C 5120" which are copolymers having acid numbers of 180 and 120 respectively. Additional constituents include water, and a diethyl amino ethanol, or "DEAE", which as noted above is a useful surfactant and dispersal agent. The particular compositions and their constituents are listed on Table 1, and further include some observed characteristics of the resultant dispersions formed.

TABLE 1

| Example: | E/AA co-polymer (g) | Copolymer type | DEAE (g) | water (g) | Remarks: |
|---|---|---|---|---|---|
| D1 | 2.0 | A-C 5180 | 0.6 | 30.0 | murky solution |
| D2 | 4.0 | " | 1.2 | 30.0 | slightly yellow |
| D3 | 6.0 | " | 1.8 | 30.0 | milky white |
| D4 | 8.4 | " | 2.4 | 30.0 | tan color |
| D5 | 10.0 | " | 3.0 | 30.0 | slight gellation upon cooling |
| D6 | 12.0 | " | 3.6 | 30.0 | rust colored, gellation |
| D7 | 3.75 | A-C 5120 | 2.0 | 146.25 | cloudy, slight gellation |
| D8 | 3.75 | " | 3.0 | 146.25 | cloudy, slight yellow, good fluidity |
| D9 | 3.75 | " | 4.0 | 146.25 | cloudy, slight yellow, good fluidity |
| D10 | 2271.25 | A-C 5180 | 682.4 | 15.97 kg | |
| D12 | 5.8 | " | 2.5 | 245.1 | |

TABLE 1-continued

| Example: | E/AA copolymer (g) | Copolymer type | DEAE (g) | water (g) | Remarks: |
|---|---|---|---|---|---|
| D13 | 17.5 | " | 5.0 | 227.5 | |
| D14 | 29.2 | " | 10.8 | 212.0 | |

The compositions were formulated by generally combining the constituents in a suitable vessel, including ordinary laboratory breakers, and heating the constituents to the boiling point of the water in order to form the dispersions of the organic constituents. The characteristics of these materials are noted in Table 1.

EXAMPLES D-11

The constituents listed on Table 1A were weighed out prior to mixing. The ceramic material used was an alumina oxide, "A16- SG Alumina" available from Alcoa. This material is described as a superground calcined alumina with a crystal size of 0.3 to 0.6 microns and with a surface area of 9 square meters per gram.

TABLE 1A

| Constituent: | |
|---|---|
| Al2O3 (A16-SG): | 80.0% |
| A-C 5180 | 16.8% |
| Aclyn 246 | 2.25% |
| Ethocel 20-231 | 0.475% |
| HEC QP15000H | 0.475% |

All mixing was done on a 5 horsepower Haake rheocord torque rheometer using a C.W. Brabender prep mixer outfitted with camlades. In preparation, vacuum grease was used to lubricate the shafts of the cam rollers and the faces of the mixing bowl joining the front and back plate so to prevent leakage of the aqueous organic composition. Subsequently, the drive speed was set at 25 rpm.

First, the Methocel 20-231 was combined with the HEC QP15000H in a separate container and set aside. The mixer was energized and the Al$_2$O$_3$ was slowly added to the mixing bowl so to keep the temperature of the mixing bowl less than about 30 deg.C. The Aclyn 246 was then added to the mixing bowl, and heating was initiated in order to bring the temperature to about 45 deg.C. Afterwards, heating was continued and elevated to raise the mixing bowl temperature to about 90 deg.C, during which a ram chute was placed in the opening, and the Methocel 20-231 and HEC QP15000H mixture was slowly added. When the mixture reached 90 deg.C, it was maintained at approximately this temperature and mixing continued for an additional 5 to 10 minutes. Subsequently, mixing was terminated and the mixing bowl and its contents, i.e., the slurry was allowed to cool to about 50 to 55 deg.C. The slurry was removed from the mixer, and placed in a closed container until it was ready for use.

A determination of the mixture formed was found to have the composition shown on Table 1B.

TABLE 1B

| Constituent: | |
|---|---|
| Al2O3 (A16-SG): | 80.0% |
| Organics | 5.8% |
| Water | 14.2% |

The mixture was formed into an article in an injection molding process and sintered to drive off the water and organic constituents. No surface cracks or blemishes were formed.

EXAMPLES C1-C13

Compositions comprising aqueous organic compositions and ceramic materials were produced generally in accordance with the procedure used to produce the composition noted in Example D-11 above. The particular makeup of these compositions and observed characteristics are outlined in Tables 2A, 2B and 2C. As has been noted above, the ceramic material may be "A16-SG", an "alpha" alumina oxide characterized as having approximately 9 square meters of surface area per gram of material, or "gamma" alumina oxide, characterized as having approximately 180 square meters of surface area per gram of material. Weight percentages when used are based upon the total of all of the constituents, including the ceramic; weights in grams, when used, are based on the total of all constituents, including the ceramic used.

TABLE 2A

| Example: | E/AA copolymer (%) | copolymer type (%) | DEAE (%) | water (%) | Ceramic (%) | Ceramic type |
|---|---|---|---|---|---|---|
| C3 | 2.5 | A-C 5120 | 2.5 | 25 | 70 | alpha |
| C4 | 2.0 | " | 2.5 | 25.5 | 70 | " |
| C5 | 1.0 | " | 2.5 | 26.5 | 70 | " |
| C6 | 0.5 | " | 2.5 | 27.5 | 70 | " |
| C7 | 2.5 | " | 2.5 | 25 | 70 | " |
| C8 | 2.5 | " | 2.5 | 20 | 75 | " |
| C9 | 2.5 | " | 2.5 | 15 | 80 | " |

All of the Examples C3-C9 were observed to have good fluidity, including samples C8 and C9 where the solids loading of the composition included increased amounts of ceramics.

TABLE 2B

| Example: | E/AA copolymer (g) | copolymer type (g) | DEAE (g) | water (g) | Ceramic (g) | Ceramic type |
|---|---|---|---|---|---|---|
| C1 | 2.8 | A-C 5180 | 0.75 | 30.0 | 70 | alpha |
| C2 | 2.5 | A-C 5120 | 0.75 | 30.0 | 70 | alpha |

Both of the compositions of C1 and C2 were found to form good fluid mixtures with the ceramics. It was noted that the composition according to example C2 required a longer period to form a dispersion of the E/AA and DEAE in the water, prior to the addition of the ceramic, however, once dispersed and introduced to the ceramic, the resulting composition was observed to have good characteristics, particularly fluidity. This was attained with the A-C 5120 which has an acid number of 120, while generally the A-C 5180 with an acid number of 180 might be thought to be preferable.

Further compositions included C10 - C12 which were formed in the manner generally described above for the formation of the aqueous organic compositions are noted in Table 2C.

TABLE 2C

| Example: | E/AA copolymer (g) | copolymer type (g) | DEAE (g) | water (g) |
|---|---|---|---|---|
| C10 | 5.8 | A-C 5180 | 2.5 | 245.1 |

TABLE 2C-continued

| Example: | E/AA co-polymer (g) | copolymer type (g) | DEAE (g) | water (g) |
|---|---|---|---|---|
| C11 | 17.5 | " | 5.0 | 227.5 |
| C12 | 29.2 | " | 10.8 | 212.0 |

Each of the materials according to Examples C10–C12 were then individually combined with sufficient "alpha" alumina oxide so to form a weight percentage ratio of 30 % organics to 70% ceramic. All of the resultant compositions exhibited good wetting of the ceramic material and good fluidity of the compositions, particularly the composition of C12. Of particular note is that the compositions C10, C11 and C12 were formed using the compositions of Examples D12, D13 and D14 respectively.

EXAMPLES C13–C19

An aqueous organic composition comprising 2.5% E/AA copolymer having an acid number of 180 (A-C 5180), 1.4% DEAE, and 96.1% water was formed by combining the constituents and heating until a dispersion of the organics was formed in the aqueous phase. This composition was then used with the ceramic compositions outlined on Table 3 wherein the ceramics were one or more of "alpha" and "gamma" type ceramics. The particular compositions are outlined, and include the relative ratios of the ceramic materials, and the effective surface area per gram thereby realized.

TABLE 3

| Example: | percentage | ratio of ceramic "alpha"/ "gamma" | surface area m2/g | condition observed |
|---|---|---|---|---|
| C13 | 50 | 100/0 | 9 | fluid |
| C14 | 50 | 80/20 | 43 | fluid |
| C15 | 50 | 60/40 | 77.4 | fluid |
| C16 | 50 | 40/60 | 111.6 | fluid |
| C17 | 50 | 20/80 | 145.8 | fluid |
| C18 | 50 | 0/100 | 180.0 | pasty |
| C19 | 47.6 | 0/100 | 180.0 | fluid, slight gel |

Each of the compositions may be composed generally in accordance with the procedures outlined for Example D-11 above. Of note is that the aqueous organic composition of the present invention allows for mixtures of metal oxides and with solids loading of 50% to be successfully realized.

The mixture of these or other ceramics is frequently desired so to increase the effective surface area of the ceramic per unit gram of ceramic, or per unit volume of an article formed from the ceramic by a molding or casting process. One such example is wherein the ceramic article forms a support substrate for a second material wherein the deposition of a large amount of the second material would be desirous. Among other examples, use is automobile catalytic conversion devices, and as supports for other catalysts is contemplated.

While the above examples illustrate a plurality of successful embodiments of the invention, it is realized that other embodiments may be made by ones skilled in the art and these further embodiments in accordance with the teachings of the present invention are considered to form a part of the invention.

I claim:

1. An mixture of a ceramic material and an aqueous organic composition wherein the aqueous organic composition comprises an aqueous dispersion of an ethylene copolymer.

2. The mixture according to claim 1 wherein the ethylene copolymer is a copolymer of ethylene and an alpha,beta-ethylenically unsaturated carboxylic acid having at least one carboxylic group and which contains between 3 and 4 carbon atoms.

3. The mixture according to claim 2 wherein the ethylene copolymer is a copolymer of ethylene and an alpha,beta-ethylenically unsaturated carboxylic acids having at least one carboxylic group and which contains between 3 and 4 carbon atoms selected from the group consisting of: acrylic acid, and, methacrylic acid.

4. The mixture according to claim 3 wherein the ethylene copolymer is a copolymer of ethylene and acrylic acid.

5. The mixture according to claim 2 wherein the copolymer of ethylene and an alpha,beta-ethylenically unsaturated carboxylic acid having at least one carboxylic group and which contains between 3 and 4 carbon atoms has an acid number greater than 120.

6. The mixture according to claim 2 wherein the copolymer of ethylene and an alpha,beta-ethylenically unsaturated carboxylic acid having at least one carboxylic group and which contains between 3 and 4 carbon atoms has an acid number greater than 150.

7. The mixture according to claim 2 wherein the copolymer of ethylene and an alpha,beta-ethylenically unsaturated carboxylic acid having at least one carboxylic group and which contains between 3 and 4 carbon atoms has an acid number greater than 180.

8. The mixture according to claim 2 which further comprises a surfactant.

9. The mixture according to claim 8 wherein the surfactant is diethyl amino ethanol.

10. The mixture according to claim 2 which further comprises a binder material.

11. The mixture according to claim 10 wherein the binder material is selected from the group consisting of: methyl cellulose compounds, hydroxylethyl cellulose compounds, polyethylene ionomers.

12. The mixture according to claim 2 which further comprises a gellation agent.

13. The mixture according to claim 12 wherein the gellation agent is one or more agents selected from the group consisting of: agar, xantham gum, methyl cellulose, polyethylene glycol compounds.

14. The mixture according to claim 1 wherein the weight ratio of the ceramic material comprises at least 50 percent by weight.

15. A mixture of a ceramic material and an aqueous organic composition wherein the aqueous organic composition comprises an aqueous dispersion of an ethylene copolymer and a ceramic material wherein the ceramic material is at least one metal oxide selected from the group consisting of: alumina oxide, silica oxide, yttrium oxide, zirconium oxide.

16. The mixture according to claim 15 wherein the ceramic material is alumina oxide.

17. The mixture according to claim 15 wherein the ceramic material consists of particulates of a metal oxide having an average size of one micron or less.

18. The mixture according to claim 15 wherein the ceramic material consists of particulates of a metal oxide having a ratio of surface area per gram of metal oxide of at least 9 square meters per gram.

19. The mixture according to claim 15 wherein the ceramic material comprises at least 50 percent by weight of the total mixture.

20. The mixture according to claim 15 wherein the ceramic material comprises at least 70 percent by weight of the total mixture.

* * * * *